(12) United States Patent
Wu et al.

(10) Patent No.: US 6,218,328 B1
(45) Date of Patent: Apr. 17, 2001

(54) METHOD OF PREPARING A ZEOLITE BASED CATALYST MATERIAL

(75) Inventors: An-hsiang Wu, Bartlesville; Charles A. Drake, Nowata, both of OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/222,446

(22) Filed: Dec. 29, 1998

(51) Int. Cl.⁷ .................. B01J 29/068; B01J 29/60; B01J 37/00
(52) U.S. Cl. .................. 502/66; 502/60; 502/64; 502/74
(58) Field of Search .................. 502/60, 64, 66, 502/74

(56) References Cited

U.S. PATENT DOCUMENTS

| | | |
|---|---|---|
| 3,216,789 | 11/1965 | Breck et al. .................. 23/113 |
| 3,670,044 | 6/1972 | Drehman et al. .................. 260/683.3 |
| 3,674,706 | 7/1972 | Box et al. .................. 252/412 |
| 4,935,392 * | 6/1990 | Kainer et al. .................. 502/60 |
| 5,002,653 * | 3/1991 | Kennedy et al. .................. 208/118 |
| 5,118,653 | 6/1992 | Barri et al. .................. 502/242 |
| 5,143,886 | 9/1992 | Iezzi et al. .................. 502/242 |
| 5,147,837 | 9/1992 | Dessau et al. .................. 502/66 |
| 5,182,242 | 1/1993 | Marler .................. 502/66 |
| 5,430,000 | 7/1995 | Timken .................. 502/60 |
| 5,885,443 * | 3/1999 | Bogdan et al. .................. 208/138 |

* cited by examiner

*Primary Examiner*—Steven P. Griffin
*Assistant Examiner*—Christina Ildebrando
(74) *Attorney, Agent, or Firm*—Richmond, Hitchcock, Fish & Dollar

(57) ABSTRACT

A process in which a hydrocarbon feedstock containing n-butane is selectively dehydrogenated to a product containing butenes; a catalyst suitable for the selective dehydrogenation of a feedstock containing n-butane to provide a product containing butenes and a method for producing a catalyst suitable for the selective dehydrogenation of a feedstock containing n-butane to provide a product containing butenes are provided.

7 Claims, No Drawings

METHOD OF PREPARING A ZEOLITE BASED CATALYST MATERIAL

FIELD OF THE INVENTION

The invention relates to a catalyst suitable for the selective dehydrogenation of n-butane, a process for the preparation of a catalyst suitable for the selective dehydrogenation of n-butane and the use of this catalyst in a process for the selective dehydrogenation of n-butane.

BACKGROUND OF THE INVENTION

It is known that n-butane can be dehydrogenated to butenes in the presence of variety of catalyst supports impregnated with a variety of metals. The dehydrogenation often produces coke at a rate that spoils the reactivity of the catalyst in a sufficiently short period of time to render the commercial use of the catalysts infeasible. A catalyst composition has newly been found to be useful for selectively dehydrogenating n-butane to butene products without producing coke at a commercially inhibiting rate.

SUMMARY OF THE INVENTION

It is an object of this invention to at least partially dehydrogenate n-butane to butenes.

Another object of this invention is to provide an improved zeolite-based catalyst that can be utilized in the dehydrogenation of n-butane to butenes.

A further object of this invention is to provide a method for making a zeolite-based catalyst that can be utilized in the dehydrogenation of n-butane to butenes.

A still further object of this invention is to accomplish the dehydrogenation of n-butane while minimizing the co-production of coke.

The invention is a zeolite-based catalyst in which an L-type zeolite that has been modified with titania is impregnated with platinum and tin to provide a catalyst composition and a process in which a feedstock containing n-butane is passed in contact with this catalyst composition under selective dehydrogenation conditions to yield butenes as product while minimizing the co-production of coke.

Other objects and advantages of the invention will become apparent from the detailed description and the appended claims.

DETAILED DESCRIPTION OF THE INVENTION

The zeolite material used in making the inventive compositions can be any zeolite which when contacted with a feedstock containing n-butane under suitable operating conditions is effective in the conversion of n-butane to butenes. Preferably, the zeolite is of type L and more preferably is an LTL zeolite (as defined in ATLAS OF ZEOLITE STRUCTURE TYPES, W. M. Meier and D. H. Olson, Butterworth-Heinemann, Third Revised Edition 1992). The preferred type of zeolite is described as Linde Type L, $K_6Na_3[Al_9Si_{27}O_{72}].21H_2O$.

The catalyst compositions described herein also contain an inorganic binder (also called matrix material) preferably selected from among alumina, silica, alumina-silica, aluminum phosphate, clays (such as bentonite) and mixtures thereof. The content of the zeolite component of the mixture of zeolite and inorganic binder is about 50–99 (preferably about 50–80) weight percent. The content of the above-listed inorganic binders in the mixture of zeolite and inorganic binder is about 1–50 weight percent. Generally, the zeolite and organic binder components are compounded and subsequently shaped (such as by pelletizing, extruding or tableting). Generally the surface area of the compounded composition is about 50–700 $m^2/g$, and the particle size is about 1–10 mm. The compounded zeolite composition can be subjected to heat treating as described below.

In the preferred embodiment of this invention the type L zeolite is admixed with bentonite, $Al_2(OH)_5Cl.5H_2O$ and water and thoroughly blended to form a paste which is then extruded, pelleted, dried in air to form a zeolite composition suitable for use as catalyst in the dehydrogenation of n-butane.

This zeolite composition can then be subjected to a heat treatment, following the conditions set out below, before being used in the preparation of a catalyst by the preferred embodiment of this invention. In the heat treatment, the zeolite composition is exposed, by any suitable method known in the art, to a gas atmosphere under temperature and pressure conditions and for a period of time that is suitable to provide a desired heat treated product.

The gas used in the heat treatment of the zeolite composition can be selected from the group consisting of inert gases (nitrogen, helium, argon and the like), reducing gases (carbon monoxide, hydrogen and the like), air, oxygen and steam. The preferred gas is selected from among air, oxygen, nitrogen, steam and mixtures thereof. Most preferably, the treatment gas is selected from among air, oxygen, nitrogen and mixtures of two thereof.

Generally, this heat treatment can be conducted at a pressure in a range from below atmospheric pressure to about 1000 pounds per square inch absolute (psia). More typically, however, the pressure range is from about atmospheric to about 100 psia. The temperature of this heat treatment is generally in the range of about 250° C. to about 800° C. Preferably, this temperature range is from about 350° C. to about 700° C. and, most preferably, the temperature of this heat treatment is in a range of about 450° C. to about 600° C.

The time period for conducting this heat treatment must be sufficient to provide a material that is substantially dry, i.e., free of water. Generally, the period of time during which the zeolite is exposed to treating gas at appropriate conditions of temperature and pressure can range from about 0.1 hour to about 30 hours. Preferably, this heat treatment is conducted for a time period in the range of about 0.25 hour to about 20 hours and, most preferably, from about 0.5 hour to about 10 hours.

Addition of Titanium

The zeolite composition is further treated to provide a zeolite composition containing titanium. Titanium is incorporated into the zeolite composition to form a mixture of the zeolite composition and titanium. The titanium can be incorporated into the zeolite by any suitable means or method known in the art for incorporating metallic elements into a substrate material. One method is to mix the zeolite composition with at least one anhydrous compound, followed by a heat treatment preferably at about 700–800° C. for about 1–10 hours in an inert gas stream. Another method, presently preferred for impregnating the zeolite composition, uses a liquid impregnation solution containing a concentration of titanium sufficient to ultimately provide the final inventive composition with the concentration of titanium in the required range.

When titanium is incorporated into the zeolite composition with an aqueous solution of a titanium compound, the preferred impregnation solution is an aqueous solution of titanium ethoxide. The titanium-impregnated zeolite composition is then heat treated, preferably at about 400–700° C. for about 1–10 hours in an inert gas stream. The titanium-impregnated zeolite composition is then calcined in an oxidizing atmosphere, preferably at about 400–700° C. for about 1–10 hours to produce a titania-impregnated zeolite composition.

Any water soluble titanium compound is suitable for use in the impregnation of the zeolite in this invention. Suitable titanium compounds include, but are not limited to, titanium halides, tetraalkyl titanates of the general formula $Ti(OR)_4$ wherein each R is an alkyl group (such as tetraethyl titanate, tetraisopropyl titanate, tetrabutyl titanate), titanium methoxide and titanium ethoxide. At present, titanium ethoxide is preferred.

The amount of titanium incorporated or impregnated into the zeolite should provide a concentration effective to assure predetermined butene conversion yields employing the catalyst composition in the selective dehydrogenation of feedstock that contains n-butane. Generally, the weight percent of titanium present both in the titanium impregnated zeolite composition and in the zeolite composition containing additional metal impregnants is in a range of about 0.001 to about 10 weight percent of the impregnated zeolite composition. The preferred concentration of titanium in both the titanium impregnated zeolite composition and in the zeolite composition containing additional metal impregnants is in the range of about 0.01 to about 5 weight percent and, more preferably, from about 0.1 to about 2 weight percent.

The titanium impregnated zeolite composition is calcined to provide a titania-modified zeolite composition. The calcination process is conducted in an oxidizing atmosphere preferably in the presence of oxygen or air although a non-interfering amount of a carrier gas inert to the oxidation process can also be present. This heat treatment can be conducted at a pressure in a range from below atmospheric pressure to about 1000 pounds per square inch absolute (psia), more typically from about atmospheric to about 100 psia. The temperature of this heat treatment is generally in the range of about 250° C. to about 800° C. Preferably, this temperature range is from about 350° C. to about 700° C. and, most preferably, the temperature of this heat treatment is in a range of about 450° C. to about 600° C. The period of time during which the zeolite is exposed to treating gas at appropriate conditions of temperature and pressure can range from about 0.1 hour to about 30 hours, preferably, from about 0.25 hour to about 20 hours and, most preferably, from about 0.5 hour to about 10 hours.

Addition of Platinum and Tin

After the heat treatment the titania-modified zeolite composition is further treated to provide a catalyst composition containing platinum and tin. Both platinum and tin are incorporated into the titania-modified zeolite composition to form a mixture of titania-modified zeolite, platinum and tin. The platinum and tin can be incorporated into the titania-modified zeolite composition by any suitable means or method known in the art for incorporating metallic elements into a substrate material. One method is to mix the titania-modified zeolite composition with at least one anhydrous compound, followed by a heat treatment preferably at about 700–800° C. for about 1–10 hours in an inert gas stream. Another method, presently preferred for impregnating the titania-modified zeolite composition, uses a liquid impregnation solution containing a concentration of platinum and tin sufficient to ultimately provide the final inventive composition with the concentration of platinum and tin in the required range.

Generally, any platinum-containing compound can be employed in the process of this invention. Examples of suitable platinum compounds include, but are not limited to, chloroplatinic acid, platinic chloride, platinum bromide, platinum iodide, tetramine platinum chloride, tetramine platinum nitrate, tetramine platinum hydroxide, tetrachlorodiamine platinum and combinations of any two or more thereof.

Any tin-containing compound can be employed in the process of this invention. Examples of suitable tin compounds include, but are not limited to, stannous acetate, stannic acetate, stannous bromide, stannic bromide, stannous chloride, stannic chloride, stannous oxalate, stannous sulfate, stannic sulfate, stannous sulfide and combinations of any two or more thereof.

When platinum and tin are incorporated into the titania-modified zeolite with an aqueous solution of a platinum or a tin compound, the preferred impregnation solution is an aqueous solution, preferably chloroplatinic acid for the impregnation with platinum, or an aqueous solution formed by dissolving a salt of tin, preferably hydrated stannous chloride ($SnCl_2.2H_2O$), in water. It is acceptable, however, to use a somewhat acidic solution to aid in the dissolution of the metal salt. The platinum- and tin-impregnated, zeolite is then heat treated, preferable at about 400–700° C. for about 1–10 hours in an inert gas stream.

The amount of platinum and tin incorporated or impregnated into the zeolite should provide a concentration effective to assure predetermined butene conversion yields employing the catalyst composition in the selective dehydrogenation of feedstock that contains n-butane. Generally, the weight percent of platinum or tin present in the impregnated zeolite is in a range of about 0.001 to about 10 weight percent of the impregnated zeolite composition. The preferred concentration of platinum or tin in the impregnated zeolite is in the range of about 0.01 to about 5 weight percent and, more preferably, from about 0.1 to about 2 weight percent of the impregnated zeolite composition.

Generally, this heat treatment can be conducted at a pressure in a range from below atmospheric pressure to about 1000 pounds per square inch absolute (psia). More typically, however, the pressure range is from about atmospheric to about 100 psia. The temperature of this heat treatment is generally in the range of about 500° C. to about 1000° C. Preferably, this temperature range is from about 600° C. to about 900° C. and, most preferably, the temperature of this heat treatment is in a range of about 650° C. to about 850° C.

Generally, the period of time during which the zeolite is exposed to treating gas at appropriate conditions of temperature and pressure can range from about 0.1 hour to about 30 hours. Preferably, this heat treatment is conducted for a time period in the range of about 0.25 hour to about 20 hours and, most preferably, from about 0.5 hour to about 10 hours and results in a calcined, steam treated product suitable for use in a catalyst bed.

The process of this invention applies most specifically to the conversion of n-butane to butenes. The feedstock can be any feedstock that contains n-butane. The higher the content of n-butane the more preferred is a feedstock for this invention. Among the feedstocks for which this invention is useful are those having a content of cracked hydrocarbon feedstocks from the catalytic cracking (e.g., fluidized catalytic cracking and hydrocracking) of gas oils and the thermal cracking of light hydrocarbons, naphthas, gas oils, reformates and straight-run gasoline. The cracked gasoline feedstock generally comprises hydrocarbons containing 2–16 carbon atoms per molecule chosen from among paraffins (alkanes) and/or olefins (alkenes) and/or naphthenes (cycloalkanes). A more preferred feedstock for the process of this invention is a cracked gasoline derived from the fluidized catalytic cracking of gas oil, suitable for use as at least a gasoline blend stock generally having a boiling range of from about 80° F. to about 430° F. The boiling range of the cracked hydrocarbon feedstock is determined by the standard ASTM method for measuring the initial boiling point and the end-point temperatures. Generally the content of paraffins exceeds the combined content of olefins, naphthenes, and aromatics (if present).

Feedstock containing n-butane and the catalyst compositions can be contacted within a reaction zone in any suitable manner. The contacting can be operated with a catalyst bed in a reactor vessel as a batch process or, preferably, as a continuous process. In either a batch or a continuous process a solid catalyst bed can be employed. Both the batch and continuous modes of operation have known advantages and disadvantages so that one skilled in the art can select the mode most suitable for a particular feedstock to be contacted with the inventive catalyst arrangement.

Contacting the feedstock containing n-butane and the catalyst composition is carried out in a reaction zone containing the catalyst compositions while employing reaction conditions that promote the dehydrogenation of n-butane with the formation of butenes. The reaction temperature employed in the contacting is in the range of from about 300° C. to about 800° C., preferably, from about 400° C. to about 700° C. and, more preferably, from 500° C. to about 600° C. The pressure employed in the contacting can range from subatmospheric up to about 500 psia and, preferably, from about atmospheric to about 400 psia.

The flow rate at which the cracked hydrocarbon feedstock is charged to the conversion reaction zone for contact with the catalyst composition is selected to provide a weight hourly space velocity (WHSV) in a range having an upward limit of about 1000 hour$^{-1}$. The term "weight hourly space velocity", as used herein, shall mean the numerical ratio of the rate at which a cracked hydrocarbon feedstock is charged to the conversion reaction zone in pounds per hour divided by the pounds of catalyst contained in the conversion reaction zone to which the hydrocarbon is charged. The preferred WHSV of the feed to the conversion reaction zone, or contacting zone, can be in the range of from about 0.25 hour$^{-1}$ to about 250 hour$^{-1}$ and, more preferably, from about 0.5 hour$^{-1}$ to about 100 hour$^{-1}$.

The following examples are presented to further illustrate this invention and are not to be construed as unduly limiting its scope.

EXAMPLE I

This example illustrates the preparation of catalysts which were subsequently tested as catalysts in the selective dehydrogenation of n-butanes to butenes.

Catalyst A (Control)—LTL Zeolite Impregnated with Platinum and Tin.

A quantity of 400 gm of commercially available LTL-K zeolite catalyst provided by C. U. Chemie Euticon A. G., a Swiss corporation, under their product designation "L-Zeocat" was admixed with 12.0 gm of Bentonite, 48.0 gm of $Al_2(OH)_5Cl.5H_2O$ and 216 g of water. The mixture was blender mixed into a paste and extruded into 1/16 inch pellets which were air dried at 125° for 3 hours and then calcined at 500° C. for 3 hours to yield an alumina-bound zeolite catalyst.

A 37 percent solution of HCl in water was added to a mixture of chloroplatinic acid and hydrated tin chloride ($SnCl_2.2H_2O$) to form a solution having 1 wt percent of chloroplafinic acid, 0.65 wt percent of tin chloride, 8.35 wt percent HCl and 90 wt percent water.

A quantity of 50 gm of the alumina-bound zeolite catalyst was admixed with an 11.1 gm quantity of the aqueous solution containing platinum and tin. The impregnated zeolite was dried and calcined with air flow at a temperature of 538° C. for 6 hours to produce 20.0 gm of alumina-bound zeolite impregnated with 0.21 wt. percent platinum and 0.15 wt. percent tin.

Catalyst B and C (Invention)—Titania-modified LTL Zeolite Impregnated with Platinum and Tin.

A quantity of 10.0 g of the alumina-bound zeolite catalyst produced for Catalyst A was admixed with 5.56 g of a 3 wt percent aqueous solution of titanium ethoxide and calcined for 6 hours at 538° C. to provide 9.43 g of titania-modified alumina-bound zeolite.

A quantity of 6.05 g of the aqueous solution containing platinum and tin produced for Catalyst A was admixed with the 9.43 g of titania-modified alumina-bound zeolite produced above and calcined at 538° C. for 6 hours to yield 9.25 g of titania-modified alumina-bound zeolite impregnated with 0.25 wt percent platinum and 0.22 wt percent tin.

EXAMPLE II

This example illustrates the use of the Zeolite materials described in Example I as catalysts in the selective dehydrogenation of n-butane to butenes.

For each of the test runs, a 3.0 g sample of the catalyst materials described in Example I was placed into a stainless steel tube reactor (length: about 18 inches; inner diameter: about 0.5 inch). An n-butane feedstock was passed through the reactor at a flow rate of about 5 WHSV, at a temperature of about 550° C. and at atmospheric pressure (about 0 psig). The runs using Catalysts A and B were done without use of a carrier gas. Hydrogen at a rate of 18.6 L/hr and a mol ratio of hydrogen to hydrocarbon of about 3 was used a carrier gas for the run using Catalyst C. The formed reaction product exited the reactor tube and passed through several ice-cooled traps. The liquid portion remained in these traps and was weighed. The volume of the gaseous portion which exited the traps was measured in a "wet test meter". Liquid and gaseous product samples (collected at hourly intervals) were analyzed by means of a gas chromatograph. Results of the test runs for Catalysts A through C are summarized in Table I. All test data were obtained up to about 7 hours on stream except for Catalyst A which was obtained up to about 6 hours on stream.

TABLE I

| Catalyst | Ti Wt %[1] | PT Wt %[1] | Sn Wt %[1] | $H_2/n\text{-}C_4$ Mol Ratio | n-Butane Wt % Conv. | Butenes Wt % Prod. | Coke Avg. Wt %/hr |
|---|---|---|---|---|---|---|---|
| A (Cont.) | 0.000 | 0.211 | 0.146 | 0.000 | 20.668 | 17.149 | 0.282 |
| B (Inv.) | 0.144 | 0.249 | 0.244 | 0.000 | 30.079 | 24.839 | 0.106 |
| C (Inv.) | 0.144 | 0.249 | 0.244 | 3.000 | 23.102 | 20,696 | 0.025 |

[1]Wt % of composition

The tests show that Catalyst A (Control), an LTL zeolite impregnated with platinum and tin, was not as efficient in the selective dehydrogenation of n-butane to butenes as Catalysts B and C (Invention), a titania-modified LTL zeolite impregnated with platinum and tin. The inventive catalyst was used in the selective dehydrogenation of n-butane both without using hydrogen as a co-feed in the dehydrogenation (with Catalyst B) and with hydrogen as a co-feed in the dehydrogenation (with Catalyst C). The dehydrogenation employing catalyst without titania modification converted a lesser weight percentage of the n-butane and produced a lesser weight percentage of butenes with a greater average hourly production of coke than employing the titania-modified zeolite either with or without hydrogen co-fed to the dehydrogenation. The titania-modified zeolite converted a greater weight percentage of n-butane in the feedstock to a greater weight percentage of butenes in the product while producing a better than satisfactory average amount of coke per hour. Although the use of hydrogen co-feed reduced the coke production, as expected, the n-butane conversion and butenes production were less than without the hydrogen co-feed. The relatively low cost of operation without using the hydrogen co-feed makes the platinum and tin impregnated titania-modified zeolite very attractive as catalyst for the selective dehydrogenation of n-butane.

Reasonable variations, modifications and adaptations can be made within the scope of the disclosure and the appended claims without departing from the scope of this invention.

That which is claimed is:

1. A method for preparing a catalyst wherein the method comprises:

(A) admixing LTL zeolite, aluminum hydroxychloride and Bentonite to provide an LTL zeolite composition and (B) calcining the LTL zeolite composition to provide a calcined LTL zeolite composition;

(C) adding titanium to the calcined LTL zeolite composition by impregnating with a titanium compound to provide a titanium-modified LTL zeolite composition;

(D) calcining the titanium-modified LTL zeolite composition to provide a titania-modified LTL zeolite composition and (E) adding platinum and tin to the titania-modified LTL zeolite by impregnating the titania-modified LTL zeolite composition with a platinum-tin impregnating solution to provide a titania-modified LTL zeolite composition impregnated with platinum and tin.

2. A method for preparing a catalyst according to claim 1 wherein the titanium compound is chosen from the group consisting of titanium halides, titanium methoxide, titanium ethoxide and tetraalkyl titanates of the general formula $Ti(OR)_4$ wherein each R is an alkyl group.

3. A method for preparing a catalyst according to claim 2 wherein the titanium compound is titanium ethoxide.

4. A method for preparing a catalyst according to claim 2 wherein the platinum compound is chosen from the group consisting of chloroplatinic acid, platinic chloride, platinum bromide, platinum iodide, tetramine platinum chloride, tetramine platinum nitrate, tetramine platinum hydroxide, tetrachlorodiamine platinum and combinations of any two or more thereof and the tin compound is chosen from the group consisting of stannous acetate, stannic acetate, stannous bromide, stannic bromide, stannous chloride, stannic chloride, stannous oxalate, stannous sulfate, stannic sulfate, stannous sulfide and combinations of any two or more thereof.

5. A method for preparing a catalyst according to claim 4 wherein the platinum compound is chloroplatinic acid.

6. A method for preparing a catalyst according to claim 4 wherein the tin compound is stannous chloride.

7. A method for preparing a catalyst according to claim 4 wherein the platinum compound is chloroplatinic acid and the tin compound is stannous chloride.

* * * * *